Feb. 19, 1952     C. C. MINTER     2,585,959
THERMAL CONDUCTIVITY BRIDGE FOR GAS ANALYSIS
Filed Jan. 24, 1949
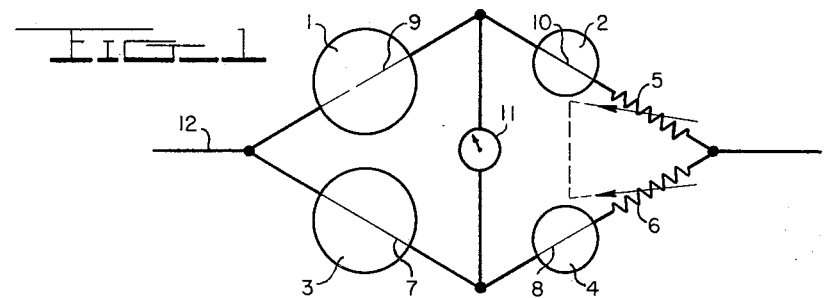
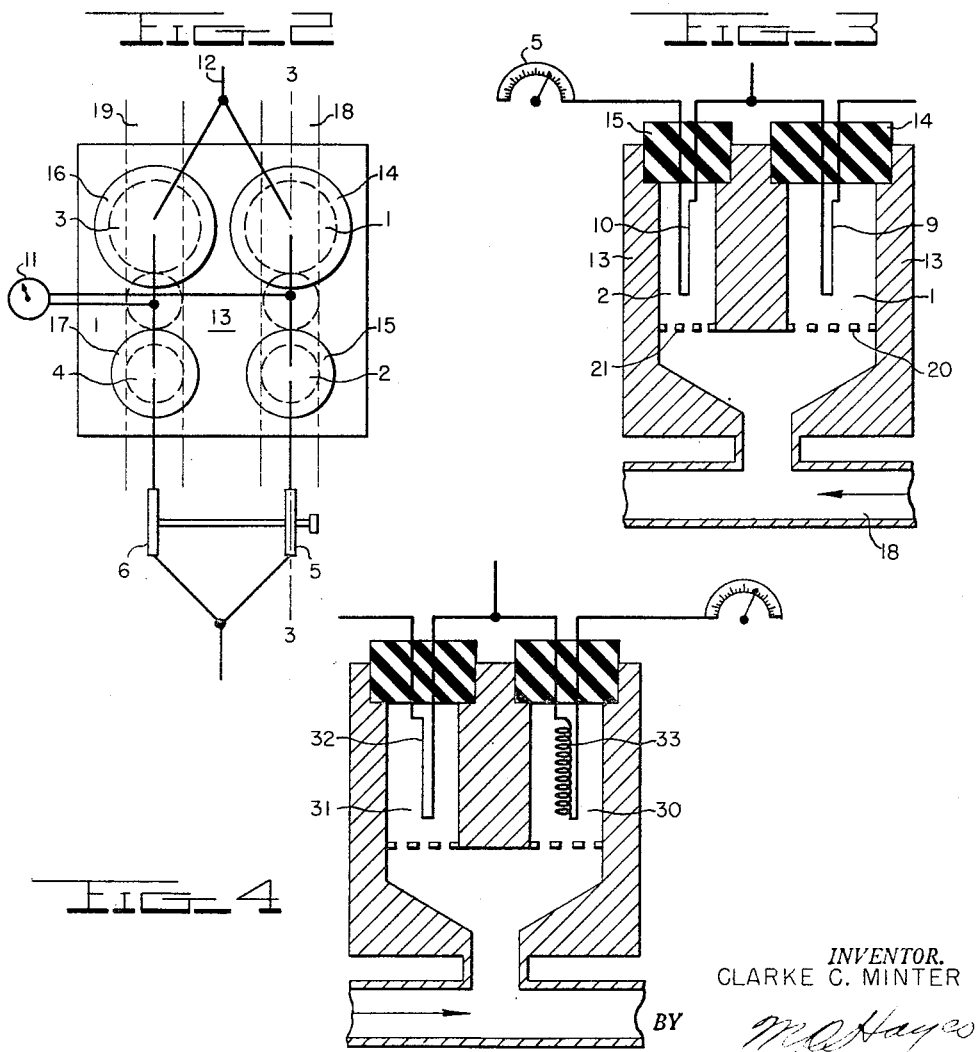
INVENTOR.
CLARKE C. MINTER
BY
ATTORNEY

UNITED STATES PATENT OFFICE 2,585,959

THERMAL CONDUCTIVITY BRIDGE FOR GAS ANALYSIS

Clarke C. Minter, Washington, D. C., assignor to Minter Instrument Corporation, New York, N. Y., a corporation of New York Application January 24, 1949, Serial No. 72,463

7 Claims. (Cl. 73—27)

(Granted under the act of March 3, 1883, as amended April 30, 1928; 370 O. G. 757)

This invention relates to the analysis of gases by means of measuring their thermal conductivity and particularly to their analysis by use of a thermal conductivity Wheatstone bridge.

The analysis of gases, or more precisely, the quantitative determination of the amount of the minor component present in a binary mixture of gases, by measurements of thermal conductivity is a rather highly developed art. The method is most satisfactory for determinations of binary mixtures having the minor component present in relatively small amounts since the thermal conductivity is a straight-line function of composition in such cases.

The instrument invariably used to measure the relative thermal conductivity of gases is the thermal conductivity Wheatstone bridge, with which the thermal conductivity of an ambient gas is measured by its effect on the temperature of a heated wire, and this temperature is in turn measured by its effect on the electrical resistance of the wire. By the use of a plurality of cells containing respectively the binary mixture to be analyzed and the pure major constituent to be used as a reference gas and each having a filament running axially therethrough, Wheatstone bridge circuit may be arranged wherein the resistance of the filaments may constitute a measure of the composition of the binary relative to that of the reference gas. A common industrial use of this method is the determination of small quantities of carbon dioxide in air, a quantity of the latter being used as the reference gas. Air may be considered a "pure" gas for purposes of this type of analysis since it is rather constant in composition, and in any event variations in composition are not harmful if it is kept in mind that the method is essentially a comparative one.

The analysis of ternary or high order systems is possible with conventional methods and equipment provided that they may be reduced to a series of lower order systems. Thus, in a mixture of carbon dioxide, hydrogen and air, the carbon dioxide may be simply determined against an air reference gas after the removal of hydrogen from a quantity of the ternary and hydrogen may similarly be determined after removal of carbon dioxide. The process is somewhat simplified by first removing $CO_2$ from a quantity of gas and using the resulting air-$H_2$ mixture as a reference gas to determine the concentration of $CO_2$ in the ternary, and then removing $CO_2$ from a test sample and determining $H_2$ in air against an air reference. However, the necessity of quantitatively removing even one gas from a ternary is a serious operational disadvantage and additional inconvenience exists in the need for making proper calculations before knowing the actual percentage composition of the ternary.

It is the general object of the present invention to provide an apparatus and method for determining one minor component of a ternary gas mixture in the presence of the other against a single unitary reference gas.

It is another object to provide an apparatus and method for analyzing a ternary mixture without the need for removing a component either from the test sample or the reference sample and without the need for making calculations to compensate for each removal.

It is a still further object to provide an apparatus which may be made permanently insensitive or "neutral" with respect to a given gas so that any one of a series of other gases may be determined in the presence of the given gas against a unitary reference gas.

It is the particular object of the invention to provide a method and apparatus which may be used to determine the amount of $CO_2$ and $H_2$ in air against an air reference without the absorption of either $CO_2$ or $H_2$.

Other objects and advantages will be apparent from the following description of the invention.

A description of neutralizing or conditioning operation follows hereinafter.

The accompanying drawing illustrates the scheme of the inventive apparatus and two preferred embodiments.

Figure 1 is a circuit-schematic diagram of the type commonly used in the art showing the basic arrangement of the thermal conductivity Wheatstone bridge of this invention.

Figure 2 is a plan view of an apparatus made in accordance with one embodiment of the invention.

Figure 3 is a section view along the line 3—3 of the apparatus shown in Figure 2.

Figure 4 is a section view similar to that of Figure 3 of an apparatus made in accordance with another embodiment of the invention.

Referring to Figure 1, it will be seen that the two parallel sides of the bridge are symmetrical and that each consists of an arm comprising a large diameter cell 1, 3, and an adjacent arm comprising a small diameter cell 2, 4 and a variable resistor 5, 6 in series. These cells of different diameter are referred to as "dissimilar cells" in this specification. It will be noted that the two variable resistors are ganged. While "ganging" is not essential, it is important that the resistance of both of the arms may be increased by exactly the same amount for reasons which will be described in more detail later.

Voltage indicating means 11 operates to show the state of balance of the bridge. A constant source of current is shown by lead 12.

The diameter of the filaments 7, 8, 9, 10 in each of the four cells is the same and, as will appear below, the difference as between adjacent arms in the ratio of cell diameter to filament diameter, together with the presence of the variable resistors, is the critical characteristic of the apparatus. All of the filaments used in an apparatus should be made of material having substantially the same temperature coefficient of resistances. In the conventional thermal conductivity bridge all the cells and all the filaments are respectively of the same diameter, and the variable ganged resistors are absent.

Figure 2 is a plan view of an apparatus made according to the scheme shown in Figure 1. The base-element 13 of the apparatus is preferably a metallic block in which holes have been drilled to form the cells designated by corresponding reference numerals from the schematic diagram, Fig. 1. A convenient recommended diameter for the cells is about 0.25 in. for the small cell and from 0.5 in. to 1 in., depending on the gas being analyzed, for the large cells. The ganged resistors, leads and balance indicating means are also correspondingly designated. Heavy insulator caps 14, 15, 16 and 17, cover the cells. Pipes or tubes 18 and 19 for delivery of the gas to be analyzed and the reference gas are shown beneath the apparatus block. The particular apparatus illustrated can be used for analysis of a continuous stream of gas. The direction of gas flow is immaterial.

The principle of operation of the bridge in Figures 1–3 depends on the variations in thermal conductivity of a given gas as the diameter of the cells is varied. The thermal conductivity of a given $H_2$-air mixture relative to air is greater in cells of small diameter, such as cells 2 and 4 than in cells of larger diameter, such as cells 1 and 3. On the other hand, the thermal conductivity of a given $CO_2$-air mixture relative to air is less in a cell of small diameter than in a cell of larger diameter. In either case, therefore, whether for $H_2$-air or $CO_2$-air mixture, the cells of small diameter show a greater difference in conductivity relative to air than the larger cells. Therefore, when comparing the thermal conductivity of a $CO_2$-air or $H_2$-air mixture with that of air in the embodiment depicted in Figures 1–3, the potential difference developed by the bridge at indicator 11 when resistances 5 and 6 are shorted out is greater for the pair of cells of small diameter than for the pair of large diameter, with the polarity of the potential difference depending on whether the mixture contains $H_2$ or $CO_2$.

In the cross-section view, Fig. 3, the elements are again correspondingly designated. Elements 20 and 21 are perforated baffles delineating the lower portion of the gas cells. These baffles serve to prevent cooling of the filaments by eddy currents due to the continuous flow of gas through the system. The area of the perforations should be proportional to the volume of the cells (area where the lengths are equal) to insure that the composition of the gases in both cells will change concurrently during continuous gas analysis. It will be noted that the filaments in the two cells are of substantially the same diameter whereas the cell diameters are different.

Figure 4 is a section view of another embodiment of the invention wherein the same general arrangement of elements is followed, but where the diameter of the cells 30, 31 are the same and the diameter of the filament wires 32, 33 (of the two adjacent arms) are different. In this embodiment, since it is necessary that the resistance of the two filaments each at its operating temperature be the same, the large diameter filament must be of greater length and is therefore shown as a helical coil.

Although in both embodiments illustrated the length of the cells is the same this is not a critical property, but rather one of practical convenience, and theoretically a straight-wire (large diameter) filament could be used in a very long cell in an embodiment of the type shown in Fig. 4. Also it should be noted that the two embodiments represent merely extreme conditions of geometry, that is similar filaments-dissimilar cells and similar cells-dissimilar filaments. Intermediate species where both cell diameter and filament diameters are different, but wherein a difference in ratio of cell diameter to filament diameter is maintained would fulfill the conditions prescribed by the invention, and would perhaps be advantageous in analysis of gases having special combinations of thermal properties.

It should be pointed out that in both of the embodiments shown in Figures 3 and 4 that the variable resistor is in series with the cell having the higher ratio of filament diameter to cell diameter.

It has been found that the unique structural characteristics of the apparatus just described give rise to the possibility of "neutralizing" the effect of certain gases on the balance of the bridge ("conditioning" the bridge) and may thus make possible the subsequent analysis of ternary mixtures against a unitary reference gas.

For example, suppose it is desired to determine $CO_2$ and $H_2$ in air with the apparatus shown in Figures 2 and 3. The apparatus is first conditioned or made insensitive with respect to $CO_2$. This is done by shorting out the resistors 5 and 6 and introducing the reference gas air into one set of dissimilar (different sized) cells through pipes 18 or 19 and a "conditioning mixture" of air and arbitrary low concentration of $CO_2$ into the other pair of dissimilar cells. A current is passed into the bridge circuit and the filaments will come to uneven temperatures which will result in an unbalance of the bridge as shown by indicator 11. Thus, for example, in a certain bridge having 8.5 ohms filament resistance it was found that with a current of 200 milliamperes and a 5% $CO_2$-air conditioning mixture a potential difference of 0.92 millivolt was registered by meter 11. The resistance of the two resistors 5 and 6 is then increased in exactly equal amounts while the current is maintained constant until the P. D. is observed to fall to zero. The requisite ultimate resistance (i. e. the range) which will be required for the resistors will depend on characteristics of the bridge, and/or the nature of the conditioning mixture and thus ultimately on the component of the unknown with respect to which the bridge is being made insensitive. For example, for the bridge mentioned above, resistors 5 and 6 must provide a resistance of 19.5 ohms to render the bridge insensitive to $CO_2$.

After the P. D. has fallen to zero, the apparatus is insensitive with respect to $CO_2$. Then the conditioning mixture is discharged from the apparatus and the $CO_2$-$H_2$-air ternary is introduced, the setting of resistors 5 and 6 remaining unchanged. The apparatus may then be used to determine $H_2$ against the air reference in the conventional manner provided the same current is used as was used in the conditioning operation. Having once been neutralized with respect to $CO_2$, a gas having a thermal conductivity less than air, the apparatus may be used to determine H, or any other gas having a conductivity greater than air (e. g. helium, methane, or neon, etc.) in a ternary mixture with air and $CO_2$.

Conversely, the apparatus shown in Figures 2 and 3 may be neutralized with respect to $H_2$ in the same manner by starting with a conditioning mixture of a convenient low concentration of $H_2$ and air. Having once been neutralized with respect to hydrogen the apparatus can be used to determine $CO_2$ or any other gas having a thermal conductivity less than air in a ternary mixture with air and $H_2$.

The conditioning operation of apparatus comprising the embodiment shown in Figure 4 is the same as described above, although the principle of conditioning is somewhat different. In this embodiment, conditioning depends on neutralizing the apparatus with respect to a gas having thermal conductivity less than that of the reference gas (again usually air) and a temperature coefficient of thermal conductivity greater than that of the reference gas. Carbon dioxide is the most important gas possessing the properties, but it may be of interest to point out that other gases or vapors such as nitrous oxide, ammonia, ethane, iso-pentane, acetone and benzene have these properties, and therefore permit the apparatus of this embodiment to be made insensitive to them. After having been made insensitive to such a gas this apparatus may be used to determine gases like hydrogen, etc. as described above.

For routine analysis or control where a bridge is always to be made insensitive to a single given gas, the conditioning operation may be carried out as an adjunct to manufacture. Thus, the bridge could be assembled with fixed resistances 5 and 6, would be permanently insensitive to a given gas when operated with the specified constant current which was used in conditioning.

It will be understood that the foregoing examples of apparatus, operation and applications are illustrative only as many other embodiments of the inventive principle will be apparent to those skilled in the arts and that the invention is not to be limited except as defined in the herewith appended claims.

The invention described herein may be manufactured and used by or for the Government of the United States of America for governmental purposes without the payment of any royalties thereon or therefor.

What is claimed is:

1. In apparatus for the analysis of gases by the thermal conductivity method, a block provided with a pair of holes of given diameter and a pair of holes of smaller diameter, four filaments of substantially equal size each disposed in a respective one of said holes, a pair of variable resistors each electrically in series with a filament disposed in one of said smaller holes and a pair of wires each connecting a filament disposed in a said smaller hole to a filament disposed in a said larger hole.

2. In apparatus for the analysis of gases by the thermal conductivity method, a block provided with a pair of relatively large holes of equal diameter and a pair of relatively small holes of equal diameter, four filaments of substantially equal diameter and of less diameter than that of said holes axially disposed respectively in said holes, a pair of variable resistors each electrically in series with a filament disposed in one of said smaller holes, a pair of wires connecting each of said resistors with a common lead wire, a pair of wires each connecting a filament disposed in one of said small holes to a filament disposed in one of said large holes, a voltage indicating means tapped across said latter pair of wires, and a pair of wires each connecting a filament disposed in a said large hole to a common lead wire.

3. An apparatus for the analysis of gases by the thermal conductivity method comprising a thermal conductivity Wheatstone bridge including first and second pairs of adjacent in-parallel arms, each of the first pair of adjacent in-parallel arms comprising a filament disposed in a cell of relatively large cross-sectional area and each of the second pair of adjacent in-parallel arms comprising a filament disposed in a cell of relatively small cross-sectional area and a variable resistor coupled in series therewith, the arms of the first pair connected in series with the corresponding arms of the second pair to thereby form a pair of substantially identical parallel branches in said bridge, whereby when a test gas to be analyzed is passed through the cells of one branch and a reference gas is passed through the cells of the other branch, the variable resistances in the second pair of arms can be varied while maintaining a constant current through the bridge to overcome the differential thermal conductivity effects of a first component of the test gas in the cells thereby rendering the bridge insensitive to the first component, so that the bridge is able to indicate the amount of a second component contained in the test gas by means of the potential difference developed between the branches due to the differential thermal conductivity effect of the said second component in the test gas compared to that of the reference gas, without having the amount of the second component indicated by the bridge affected by the presence of said first component of the test gas.

4. An apparatus for the analysis of gases by the thermal conductivity method comprising a thermal conductivity Wheatstone bridge including first and second pairs of adjacent in-parallel arms, wherein each of the first pair of connected in-parallel arms comprises a filament axially disposed in a cylindrical cell of relatively large diameter, and each of the second pair of connected in-parallel arms comprises a filament axially disposed in a cylindrical cell of relatively small diameter and a variable resistor coupled in series therewith, the arms of said first pair being connected in series with the corresponding arms of the second pair to form a pair of substantially identical parallel branches in said bridge, whereby when a ternary test gas to be analyzed is passed through the cells of one branch and a reference gas is passed through the cells of the other branch, the variable resistances in the second pair of arms can be varied while maintaining a constant current through the bridge to overcome the differential thermal conductivity effects of a first component of the ternary test gas in the various cells thereby rendering the bridge insensitive to said first component so that the bridge is able to indicate the amount of a second component contained in the test gas by means of the potential difference developed between the branches due to the differential thermal conductivity effect of the said second component in the test gas compared to that of the reference gas, without having the amount of the second component indicated by the bridge affected by the presence of said first component of the test gas.

5. An apparatus for the analysis of gases by the thermal conductivity method comprising a thermal conductivity Wheatstone bridge including first and second pairs of in-parallel arms wherein each of the first pair of connected in-parallel arms comprises a filament disposed in a cell, and each of the second pair of connected in-parallel arms comprises a filament disposed in a cell and a variable resistor coupled in series therewith and wherein each of said filaments are of substantially equal diameter and the cells of said first pair are of a larger diameter than the cells of said second pair, an arm from each pair comprising one of a pair of substantially identical parallel branches in said bridge, whereby when a test gas to be analyzed is passed through the cells of one branch and a reference gas is passed through the cells of the other identical branch, the variable resistances can be adjusted to counteract the effects of the difference in thermal conductivity of a first component of the test gas due to the different diameters of the cells in the respective branches compared to that of the reference gas thereby rendering the bridge insensitive to said first component and enabling the bridge to indicate the amount of a second component contained in the test gas without having the indication obtained by said bridge affected by the presence of the first component of the test gas.

6. A thermal conductivity Wheatstone bridge comprising a pair of substantially identical parallel-connected branches, each branch comprising a pair of series connected arms, the first arms of said branches comprising a filament enclosed in a cylindrical cell of relatively large diameter and the second arms of each of said branches each comprising a filament enclosed in a cylindrical cell of relatively smaller diameter, a separate variable resistor connected in series with the filament in each of said smaller diameter cells, the diameter of all the filaments being substantially equal, whereby when a test gas to be analyzed is passed through the cells of one branch and a reference gas is passed through the cells of the other identical branch, the variable resistances can be adjusted to counteract the effects of the difference in thermal conductivity and convection of one of the components due to the different diameters of the cells in the respective branches compared to that of the reference gas thereby rendering the bridge insensitive to said one of the components and enabling the bridge to indicate the amount of another component contained in the test gas, without having the indication obtained by said bridge affected by the presence of the said one of the components of the test gas.

7. In apparatus for the analysis of gases by the thermal conductivity method, a first pair of cells of relatively large cross-sectional area, a second pair of cells of relatively small cross-sectional area, each of said cells comprising an outer shell member and an inner filament disposed therewithin, the filaments being substantially identical, and adapted to be connected to form a bridge, a first gas duct coupled to one of said larger and one of said smaller of said cells and adapted to feed a reference gas to said cells, and a second gas duct coupled to the other of said larger and the other of said smaller cells and adapted to feed a test gas to be analyzed to said latter cells.

CLARKE C. MINTER.

REFERENCES CITED

The following references are of record in the file of this patent:

UNITED STATES PATENTS

| Number | Name | Date |
|---|---|---|
| 1,698,887 | Krueger | Jan. 15, 1929 |
| 1,818,619 | Harrison | Aug. 11, 1931 |
| 2,255,551 | Willenborg | Sept. 9, 1941 |
| 2,505,693 | Stewart | Apr. 25, 1950 |

FOREIGN PATENTS

| Number | Country | Date |
|---|---|---|
| 425,518 | Germany | Feb. 20, 1926 |